United States Patent [19]
Mullins

[11] 3,732,886
[45] May 15, 1973

[54] COPPER TUBE SERVICE VALVE

[76] Inventor: John W. Mullins, c/o J. R. Phillips, 2878 N. 7th Place, Phoenix, Ariz. 85020

[22] Filed: Apr. 26, 1971

[21] Appl. No.: 137,376

[52] U.S. Cl. ............................................. 137/318
[51] Int. Cl. .......................... B23b 41/08, F16e 41/04
[58] Field of Search ............................ 137/317, 318; 285/197, 198, 199

[56] References Cited

UNITED STATES PATENTS

| 3,162,211 | 12/1964 | Barusch | 137/318 |
|---|---|---|---|
| 3,176,708 | 4/1965 | Shields | 137/318 |
| 3,448,758 | 6/1969 | Mullins | 137/318 |
| 3,509,905 | 5/1970 | Mullins | 137/318 |

Primary Examiner—Martin P. Schwadron
Assistant Examiner—David R. Matthews
Attorney—Robert K. Rhea

[57] ABSTRACT

A generally cylindrical centrally bored housing is coaxially secured, at one end portion, within a short length of copper tubing. The other end of the copper tubing is bifurcated for connection with a line to be tapped. A valve equipped tubular core, having a length slightly less than the combined length of the housing and the copper tubing and having a line piercing tip, is freely received by the bore of the housing. A cap threadedly engaged with the free end of the housing, forces the line piercing tip into the line and seals the core with the housing and line.

3 Claims, 4 Drawing Figures

PATENTED MAY 15 1973

3,732,886

JOHN W. MULLINS
INVENTOR.

BY
Robert K. Rhea
AGENT

3,732,886

COPPER TUBE SERVICE VALVE

CROSS REFERENCE TO RELATED APPLICATION

The present invention is an improvement over my copending design application, Ser. No. D-021,708, filed Mar. 2, 1970, for A valve Receiving Tubing Connector.

BACKGROUND OF THE INVENTION

1. Field of the Invention.

The present invention relates to refrigerant lines and more particularly to a refrigerant line tapping service valve.

In order to maintain a refrigerating system operable it is necessary to periodically check and service the system and when necessary recharge the system with refrigerant gas. This is easily accomplished by the present invention which provides a valve equipped housing coaxially secured to a relatively short length of thin walled copper tubing wherein the opposite end of the copper tubing is bifurcated to partially surround and be connected, as by soldering, to a refrigerant gas containing copper line, thus, providing access to the bore of the refrigerant line intermediate its ends.

This invention is distinctive over my above referred to application by providing a connector between a valve equipped relatively thick walled housing and a refrigerant line wherein the connector is preferably formed of the same material and substantially same wall thickness as the line to be tapped. This enhances the ease of making the connection between the connector and the line which may be achieved, as by soldering. Furthermore, since the housing contains a core which seals with the wall of the pierced line and the wall of its housing it is not necessary that a gas and liquid tight seal be formed between the connector and the line being tapped.

2. Description of the Prior Art.

U.S. Pat. No. 3,162,211 discloses a line penetrating device comprising a cutting needle secured to a cap threadedly engaged with clamping means surrounding the line for forcing the needle through the wall of the line wherein resilient sealing means seals with the clamp means after piercing the line.

This invention is distinctive over this patent by providing a valve opening and closing the bore of a line piercing core which is sealed with the wall of the line, thus eliminating any resilient means and the necessity of loosening and retightening the line piercing needle each time the line is checked or serviced as by the patent.

SUMMARY OF THE INVENTION

A generally cylindrical centrally bored housing, having external threads adjacent one end portion, is coaxially connected at its other end portion within one end portion of a relatively short length of copper tubing. The other end of the copper tubing is bifurcated by an arcuate recess formed on a radius complemental with the radius of a line to be tapped forming a pair of tube legs partially surrounding opposing side portions of a line to be tapped for connecting the copper tubing, as by soldering, to the line to be tapped which usually comprises copper tubing. The housing is preferably formed from brass stock for rigidity and connecting it to a line to be tapped requires a brazing action, thus requiring more heat than is necessary for soldering, as is well understood by persons skilled in the art. A centrally bored cylindrical core, having a line piercing tip at one end portion and having an overall length slightly greater than the spacing between the free end of the housing and inner surface of the wall of the line to be tapped when connected with the copper tubing, is coaxially received by the housing. The end of the core opposite its line piercing tip is internally threaded for receiving an air valve core opening and closing the bore of the core. The core is moved longitudinally into the body by a cap threadedly engaged with the body which forces the line piercing tip through the wall of the line being tapped, in sealing relation therewith, and crimps the free end portion of the housing wall inwardly in overlapping the locking and sealing relation against the adjacent end of the core.

The principal object of this invention is to provide a service valve containing housing and connector which may be easily attached to a line to be tapped including a self-tapping core which is forced into the line to be tapped by a housing cap forming a locking seal with the end of the core opposite its line piercing tip.

DESCRIPTION OF THE PREFERRED EMBODIMENT

Figure 1:
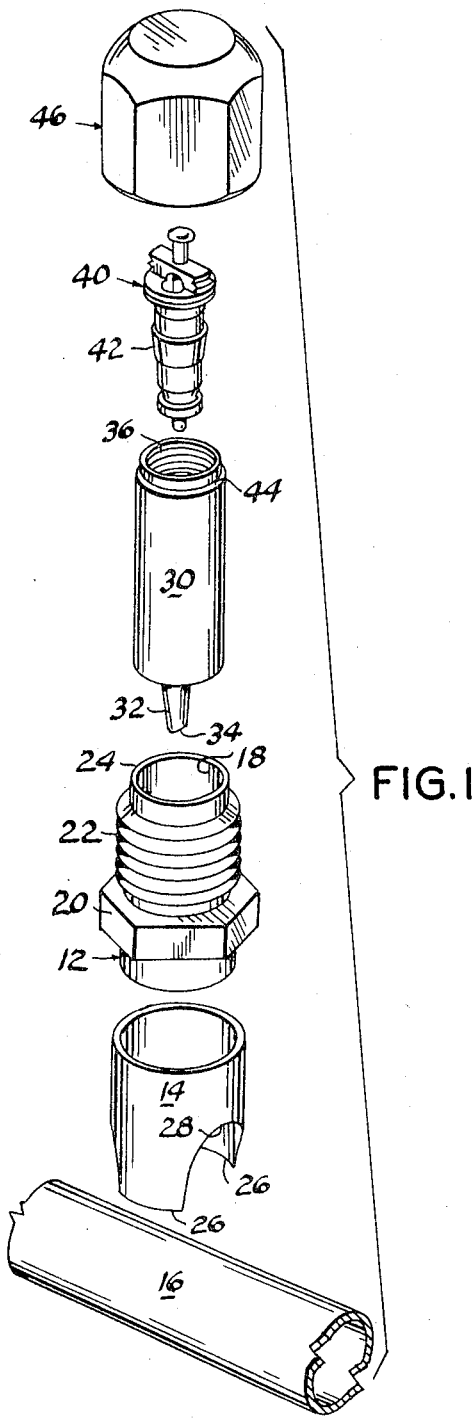
FIG. 1 is an exploded perspective view of the valve components.

Like characters of reference designate like parts in those figures of the drawings in which they occur.

In the drawings:

The reference number 10 indicates the device, as a whole, comprising a housing 12 secured to a line connector 14 in turn mounted on a line 16 to be tapped. The housing 12 is generally cylindrical, having a smooth bore 18 and having a hexagonal head 20 forming wrench flats intermediate its ends. One end portion of the housing is externally threaded, as at 22. This end portion of the housing is characterized by a reduced periphery forming a relatively thin wall 24 extending outwardly of the threads 22 for the purposes presently explained.

The other end portion of the housing, opposite the threads 22, is coaxially received within one end portion of the tubular connector 14 and is secured thereto, as by brazing, to form a gas and fluid tight joint. The connector 14 is preferably formed of the same material and wall thickness as the line 16 to be tapped. As mentioned hereinabove, in practice, the line 16 usually comprises a length of copper tubing and in this event the connector 14 is similarly formed from a length of copper tubing usually diametrically slightly greater than the diameter of the line 16 for the reasons readily apparent.

Figure 3:
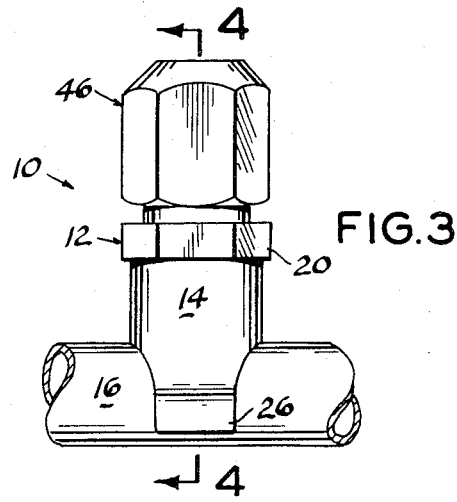
FIG. 3 is a side elevational view of the valve and connector joined to a fragmentary portion of a line; and, FIG. 4 is a vertical cross-section view taken substantially along the line 4—4 of FIG. 3.
Figure 4:
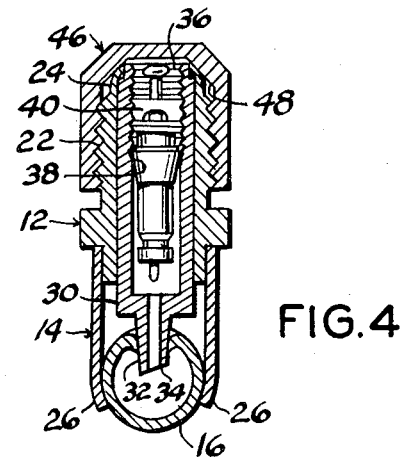
Figure 2:
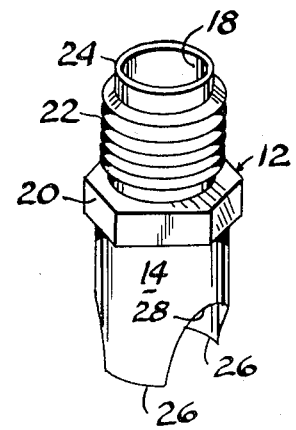
FIG. 2 is a perspective view of the housing and line connector.

The other end portion of the connector 14, opposite its housing connected end, is bifurcated by forming a transverse substantially U-shaped slot through its wall end portion defining opposing connector legs 26 and an arcuate bight portion or surface 28, preferably having a radius complemental to the outside radius of the line 16, for attaching the connector 14 to the line 16. This is accomplished by placing the bifurcated end of the connector on the line with the legs 26 straddling the line and the connector wall arcuate surface 28 contacting a peripheral portion of the line. The free end portion of the legs 26 usually project beyond the horizontal diameter of the line, as viewed in FIG. 4, permitting the free end portion of the legs to be crimped or bent inwardly in contacting relation in a partial wrap-around action on the line 16 thus temporarily positioning the connector on the line. The length of the legs, defined by the distance between the arcuate surface 28 and the free end surface of the legs 26, is preferably slightly less than the diameter of the line 16 to be tapped, as clearly shown in FIGS. 3 and 4. The connector 14 is then secured to the line, as by soldering, which is easily accomplished for the reason that the connector 14 and line 16 being formed of the same material and substantially same wall thickness is easily heated to a soldering temperature.

A substantially cylindrical core 30, preferably formed of hardened metallic material, is coaxially received by the housing bore 18 and is longitudinally slidable therethrough. The core is provided, at one end portion, with a coaxial diametrically reduced centrally bored line piercing tip end portion 32 converging toward its free end and characterized by a beveled end surface 34 forming a line cutting or piercing tip. The overall length of the core and its tip 32 is slightly greater than the spacing between the free end of the housing wall 24 and the adjacent surface of the line 16 so that the core may be substantially completely enclosed by the housing with its cutting tip entering the line 16 in the manner presently explained.

The core 30 is further characterized by internal threads 36, at its end portion opposite its tip 32, with the threads terminating inwardly of the core adjacent a beveled shoulder 38 for threadedly receiving a conventional air valve core 40 having a seal 42 sealing with the core shoulder 38. The end portion of the core, at its internally threaded end, has a portion of its periphery circumferentially reduced to form an annular shoulder 44.

An internally threaded cap 46 threadedly engages the housing threads 22 and forces the core 30 toward and into the line 16. The cap 46 is characterized by a converging wall surface 48 defining its inner closed end, inwardly of its threads, wherein this surface 48 forces the housing thin wall and 24 toward and against the circumferentially reduced end portion of the core 30 outwardly of its shoulder 44 in a crimping sealing action of the wall 24 for holding the core in place.

OPERATION

In operation the housing 12 is connected with the connector 14, as described hereinabove, at the time of manufacture. The air valve equipped core and cap 46 is supplied to the refrigerant service personnel with the assembled housing 12 and connector 14. The serviceman places the connector 14 in straddling relation upon the line 16 to be tapped and makes a soldered connection as described hereinabove.

It should be noted that this soldered connection between the connector 14 and line 16 need not necessarily be fluid tight for the reasons presently explained, however, this soldered joint between the connector 14 and line 16 must be sufficiently strong to permit withstanding the line piercing action as described hereinbelow.

The core 30, having the air valve 40 installed therein, is longitudinally inserted into the housing bore 18 with the core tip 32 contacting the surface of the line 16. The cap 46 is then manually threadedly engaged with the housing threads 22. A pair of suitable wrenches, not shown, are placed, respectively, on the housing head 20 and periphery of the cap 46 for continuing the threaded engagement of the cap 46 with the housing wherein, as the cap 46 is progressively moved toward the housing head 20, the beveled inner surface 48 of the cap contacting the wall at the threaded end portion of the core progressively forces its tip 32 through the wall of the line 16 in a piercing and sealing action. When the wall of the threaded end of the core is coextensive with the housing wall 24 the beveled inner surface 48 of the cap contacts the free end portion of the housing wall 24 and forces it inwardly in a crimping and sealing relation with respect to the reduced end portion of the core wall outwardly of its annular shoulder 44. Since the material forming the core 30 is preferably formed of relatively hard material, such as steel, its tip 32 forms a gas and liquid tight seal where it pierces the wall of the line 16 and further the thin wall 24 of the housing forms a secondary seal around the periphery of the core, at its threaded end, thus, eliminating the necessity of the fluid tight seal between the connector 14 and line 16. The bore of the core 30 is now in communication with the bore of the line 16 and by removing the cap 46 refrigerant gas may be added to or removed from the line 16 by the air core 40 opening the bore of the core 30.

Obviously the invention is susceptible to changes or alterations without defeating its practicability, therefore, I do not wish to be confined to the preferred embodiment shown in the drawings and described herein.

I claim:

1. A self-tapping service valve for a tubular line, comprising:

a generally cylindrical centrally bored housing having wrench flats intermediate its ends and having a diametrically reduc-ed periphery adjacent a relatively thin wall at one end portion, said housing having external threads extending between said wrench flats and said thin wall portion;

a tubular member coaxially secured, at one end portion, to the end portion of said housing opposite said threads, the other end portion of said tubular member being transversely bifurcated for forming a U-shaped slot having a bight portion formed on a radius substantially the same as the outside radius of a line to be tapped and defining a pair of legs straddling a line to be tapped, said tubular member having a wall thickness substantially equal with respect to the wall thickness of a line to be tapped;

a tubular core, having a length slightly greater than the spac-ing between the free end surface of said housing thin wall portion and the bight portion of the U-shaped slot, coaxially freely received by the bore of the housing, said core having a diametrically reduced tapered end portion converging toward a line to be tapped when disposed with the U-shaped slot, said tapered end portion terminating in a beveled end surface forming a line piercing tip, said core having a diametrically reduced peripheral portion adjacent its end opposite said line piercing tip forming an annular shoulder adjacent the housing thin wall portion, said core having internal threads at its end portion opposite said line piercing tip and having a seat formed on its inner wall surface at the inner limit of the threads;

an air valve sealing with the seat in said core; and, a cap engaging the threads on said housing, said cap having a beveled inner end surface contacting the adjacent outwardly disposed end surface of said core and forcing the line piercing tip of said core into a line to be tapped and subsequently contacting the outer end surface of said housing thin wall portion and forcing the latter inwardly against the outer surface of said core outwardly of said annular core shoulder in locking relation as said cap is progressively engaged threadedly with said housing.

2. A tubular line service valve, comprising:

a connector comprising a tubular member having a relatively thin wall when compared with its diameter said connector having a transverse U-shaped slot in one end portion forming an arcuate surface substantially the same as the outside radius of a line to be tapped and defining a pair of legs having a length no greater than the diameter of a line to be tapped and being adapted to straddle and be secured to a line to be tapped; and, line piercing means coaxially secured to the other end portion of said connector.

3. The service valve according to claim 2 in which said line piercing means includes:

a centrally bored housing;

a centrally bored core coaxially received in axial sliding relation by the housing bore, said core having a line piercing tip;

a valve closing the bore of said core; and, means including a cap for forcing said line piercing tip into and sealing with a line to be tapped.

* * * * *